United States Patent
Daniel et al.

(10) Patent No.: US 10,315,268 B2
(45) Date of Patent: Jun. 11, 2019

(54) METHOD AND SYSTEM TO CONTROL HEAT INPUT IN A WELDING OPERATION

(71) Applicant: LINCOLN GLOBAL, INC., City of Industry, CA (US)

(72) Inventors: Joseph A. Daniel, Sagamore Hill, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 956 days.

(21) Appl. No.: 13/792,665

(22) Filed: Mar. 11, 2013

(65) Prior Publication Data

US 2014/0124491 A1 May 8, 2014

Related U.S. Application Data (60) Provisional application No. 61/723,758, filed on Nov. 7, 2012.

(51) Int. Cl.
*B23K 9/08* (2006.01)
*B23K 9/095* (2006.01)
(Continued)

(52) U.S. Cl.
CPC ............ *B23K 9/1006* (2013.01); *B23K 9/092* (2013.01); *B23K 9/093* (2013.01); *B23K 9/095* (2013.01); *B23K 9/173* (2013.01)

(58) Field of Classification Search
CPC ... B23K 2201/26; B23K 9/0026; B23K 9/038
(Continued)

(56) References Cited

U.S. PATENT DOCUMENTS 3,657,724 A   4/1972   Feeley
3,775,585 A   11/1973  Okada
(Continued)

FOREIGN PATENT DOCUMENTS

CN   101128279 A    2/2008
JP   1993261535 A   12/1993
(Continued)

OTHER PUBLICATIONS

International Application No. PCT/IB2013/002475, International Search Report & Written Opinion, 10 pages, dated Jul. 7, 2014.

*Primary Examiner* — Tu B Hoang
*Assistant Examiner* — Thomas Ward
(74) *Attorney, Agent, or Firm* — Perkins Coie LLP (57) ABSTRACT

A system for and method of controlling the heat input in a welding operation are provided. The system includes an arc welding power supply configured to output a welding waveform to a welding torch. The welding power supply includes a waveform generator to generate an output welding waveform. The power supply also includes a controller to optimize the output welding waveform based on a desired welding temperature. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform. The desired welding temperature is one of a temperature setpoint and a temperature range.

15 Claims, 4 Drawing Sheets

(51) Int. Cl.
  *B23K 9/10* (2006.01)
  *B23K 9/09* (2006.01)
  *B23K 9/173* (2006.01)

(58) Field of Classification Search
  USPC ............... 219/54–60 A, 70, 78.01, 101–116, 219/130.1–133, 137 PS
  See application file for complete search history.

(56) References Cited

U.S. PATENT DOCUMENTS

| | | | |
|---|---|---|---|
| 4,544,826 A | 10/1985 | Nakanishi | |
| 4,555,614 A * | 11/1985 | Morris | B23K 9/0956 219/130.01 |
| 4,954,691 A | 9/1990 | Parks | |
| 4,972,064 A | 11/1990 | Stava | |
| 4,975,558 A * | 12/1990 | Lukens | B23K 9/08 219/123 |
| 4,975,588 A * | 12/1990 | Bryan | C09K 11/671 250/483.1 |
| 5,001,326 A | 3/1991 | Stava | |
| 5,003,154 A | 3/1991 | Parks | |
| 5,148,001 A | 9/1992 | Stava | |
| 6,034,350 A | 3/2000 | Heraly | |
| 6,051,810 A | 4/2000 | Stava | |
| 6,215,100 B1 | 4/2001 | Stava | |
| 6,335,511 B1 * | 1/2002 | Rothermel | B23K 9/091 219/124.03 |
| 6,384,373 B1 | 5/2002 | Schwartz | |
| 6,441,342 B1 | 8/2002 | Hsu | |
| 6,730,875 B2 | 5/2004 | Hsu | |
| 6,833,529 B2 | 12/2004 | Ueyama | |
| 7,064,290 B2 | 6/2006 | Blankenship | |
| 7,217,904 B2 | 5/2007 | Blankenship | |
| 7,919,728 B2 | 4/2011 | Era | |
| 8,067,714 B2 | 11/2011 | Era | |
| 8,680,431 B2 | 3/2014 | Stava | |
| 2004/0074884 A1 | 4/2004 | Butler | |
| 2004/0079740 A1 | 4/2004 | Myers | |
| 2005/0051524 A1 | 3/2005 | Blankenship | |
| 2005/0269297 A1 | 12/2005 | Buda | |
| 2006/0070983 A1 * | 4/2006 | Narayanan | B23K 9/092 219/130.51 |
| 2007/0051712 A1 | 3/2007 | Kooken | |
| 2007/0056944 A1 * | 3/2007 | Artelsmair | B23K 9/092 219/130.5 |
| 2007/0164007 A1 | 7/2007 | Peters | |
| 2008/0083714 A1 | 4/2008 | Kamath | |
| 2008/0156781 A1 * | 7/2008 | Artelsmair | B23K 9/091 219/130.5 |
| 2009/0026188 A1 | 1/2009 | Schorghuber | |
| 2011/0114615 A1 | 5/2011 | Daniel | |
| 2011/0278273 A1 | 11/2011 | Hirota et al. | |
| 2012/0097655 A1 | 4/2012 | Daniel | |
| 2012/0118865 A1 | 5/2012 | Stava | |

FOREIGN PATENT DOCUMENTS

| | | |
|---|---|---|
| JP | 11-314154 A | 11/1999 |
| JP | 2008531283 A | 8/2008 |
| WO | 2006089322 A1 | 8/2006 |
| WO | 2010/086933 A1 | 8/2010 |

* cited by examiner

METHOD AND SYSTEM TO CONTROL HEAT INPUT IN A WELDING OPERATION

PRIORITY

The present application claims priority to U.S. Provisional Patent Application No. 61/723,758, which is incorporated herein by reference in its entirety.

TECHNICAL FIELD

This invention relates to systems and methods for welding. More specifically, the subject invention relates to systems and methods to control heat input while welding.

BACKGROUND

When arc welding it is desirable to control heat input during welding. The welding arc generates a very high amount of heat which can significantly increase the temperature of the workpiece around the weld zone. This increase in temperature can be disadvantageous outside of the weldzone because it can detrimentally affect the material properties of the workpiece as well as cause warping, etc. Efforts to control the temperature of the workpiece include applying external cooling to the workpiece or changing the welding process. However, these methods can be complicated and provide limited results.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention include systems for and methods of arc welding in which a desired heat input is maintained by adjusting various parameters of the electrode negative portion of a welding waveform, as well as other aspects of the welding process. In some exemplary embodiments, only the electrode negative portion of the welding waveform is adjusted to obtain a waveform balance which maintains a desired arc length and/or voltage, while at the same time minimizing heat input into the weld and keeping the arc stable.

In an exemplary embodiment, a system includes an arc welding power supply configured to output a welding waveform to a welding torch. The welding power supply includes a waveform generator to generate the welding waveform. The power supply also includes a controller to control the welding waveform based on a comparison between a desired welding temperature and a detected welding temperature. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform. The desired welding temperature is one of a temperature setpoint and a temperature range.

In another exemplary embodiment, a method of controlling an arc welding system includes providing a welding torch, generating a welding waveform, and transmitting the welding waveform to the welding torch. The method further includes controlling the welding waveform based on a comparison between a desired welding temperature and a detected welding temperature. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform. The desired welding temperature is one of a temperature setpoint and a temperature range.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
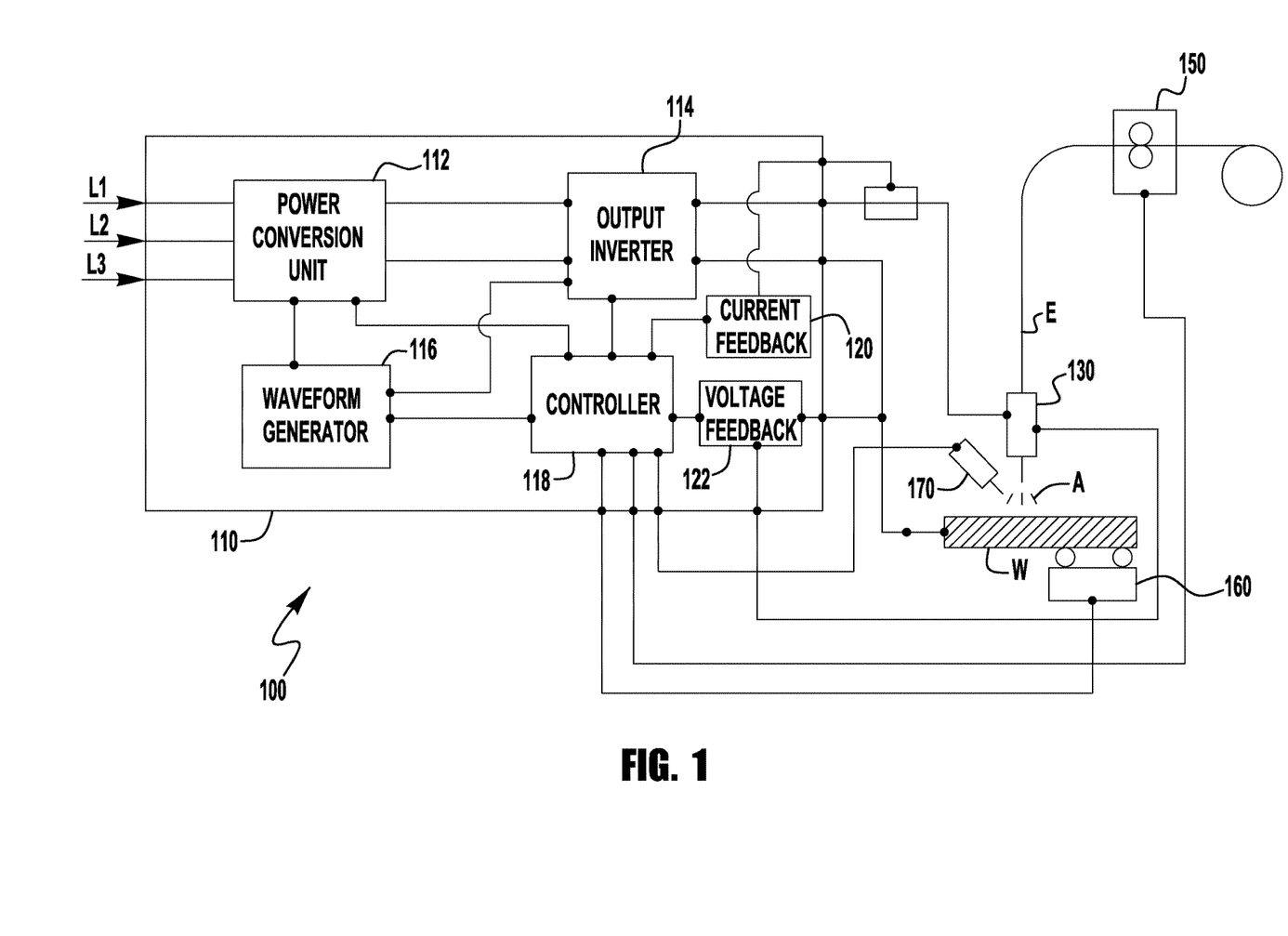
FIG. 1 is a diagrammatical representation of a welding system in accordance with an exemplary embodiment of the present invention.

FIG. 1 is an illustrative embodiment of a welding system 100 in accordance with exemplary embodiments of the present invention. The welding system contains a welding power supply 110 which delivers a welding waveform to a welding torch 130 and a workpiece W through an electrode E to generate a welding arc A. The electrode E is delivered to the welding operation via a wire feeder 150. The wire feeder 150 can be of any known construction such that it is capable of delivering the electrode E to the weld and, in some embodiments, the wire feeder 150 can adjust the wire feed speed of the electrode E based on a signal from the power supply 110—which will be discussed in more detail below.

The system 100 also contains a movement device 160 which is capable of moving either the workpiece W or the contact tip 130, or both. Such movement devices are generally known and can include a robot, a welding tractor unit, etc. In exemplary embodiments of the present invention, the movement device is capable of adjusting or changing the travel speed of the welding operation in accordance with commands received during the welding operation. As shown in FIG. 1, the commands come from the controller 118 in the power supply 110. However, in other exemplary embodiments a separate system controller can be used which is external to the power supply 110 that controls operation of components in the system 100, including the power supply 110, the wire feeder 150 and the movement device 160.

The general construction of the power supply 110 can be similar to that of known power supplies that are capable of GMAW/MIG type welding operations, so long as the power supply 110 is capable of functioning and operating as described herein. For example, the power supply 110 can be constructed similar to that of the Power Wave® type power supplies, manufactured by The Lincoln Electric Company, of Cleveland, Ohio. Of course, embodiments of the present invention are not limited to such a construction, and this is intended to be merely exemplary.

As shown in FIG. 1, the power supply 110 is capable of receiving an input signal through L1, L2 and L3. FIG. 1 depicts a 3-phase input, but other embodiments can utilize only a single phase input. The power supply 110 contains a power conversion unit 112 which is capable of receiving the input signal and outputting a signal to an output phase (such as output inverter 114) so that the output of the power supply 110 is capable of sustaining a welding arc. The power conversion unit 112 can be made up of a number of different components. For example, it can be comprised of a rectifier circuit and a buck-boost circuit which receives the rectified signal and outputs a constant voltage to the output inverter 114. Of course in other exemplary embodiments, the output inverter 114 can be a chopper, or any other type of output circuit that is capable of working with the power conversion unit 112 to output a welding signal. The power supply 110 also contains a waveform generator 116 which is a circuit which aids in controlling the output of at least one of, or both, of the power conversion unit 112 and the output inverter 114 to provide the desired welding waveform to be used to generate the arc A. For example, the waveform generator 116 can be used to generate a desired current waveform used to create and maintain the arc A during welding, coupled with one or both of the power conversion unit 112 and the output inverter 114 (or whatever output component is utilized). In addition, the power supply has a controller 118, which can be any type of CPU or processor-type device capable of controlling functions and operations of the power supply 110. Such controllers are generally known. In exemplary embodiments, the controller received feedback from a current feedback circuit 120 and a voltage feedback circuit 122 which provide current and voltage feedback (respectively) from the welding arc A during a welding operation. With this feedback, the controller 118 is able to adjust and optimize the performance of the power supply 110 to provide the desired output. This will be discussed further below.

As shown in FIG. 1, in some embodiments, the controller 118 is also coupled to a wire feeder 150 which allows the controller to receive feedback from the wire feeder 150 as well as control the operation of the wire feeder 150, such as wire feed speed, during a welding operation. This is also discussed below.

The embodiment shown in FIG. 1 also utilizes a thermal sensor 170 which monitors the temperature of the weld puddle and/or the workpiece W near the weld puddle. The sensor 170 can be any type of sensor that is capable of accurately determining the temperature of the sensed area and reporting the sensed temperature to the controller 118 so that the temperature information can be utilized. It should be noted that one sensor 170 is shown in FIG. 1, but other embodiments can use more than one sensor. For example, a plurality of sensors can be used to monitor the temperature of the weld puddle, the workpiece W adjacent to the weld puddle and/or the underside of the workpiece, where the underside is the side opposite of the torch 130 during welding.

During a welding operation the temperature of the weld puddle and/or workpiece can vary greatly. For example, at the beginning of the weld process it is likely that the workpiece has a temperature similar to that of the ambient temperature. Thus, the workpiece at the weld is relatively cold, which can require more arc energy to provide the desired puddle and/penetration. After the start up and a period of welding the workpiece W will start to heat up significantly, particularly in relatively long weld runs. If the welding operation is not changed this heating can alter the weld parameters and then result in weld with diminished quality. For example, if the temperatures are allowed to increase unchecked the workpiece can be warped or the heat affected zone around the weld bead could be too large. Thus, it is desirable to control heat input.

Embodiments of the present invention control the heat input into the weld by controlling at least one of the welding operation parameters to ensure appropriate heat input and weld quality.

Figure 2:
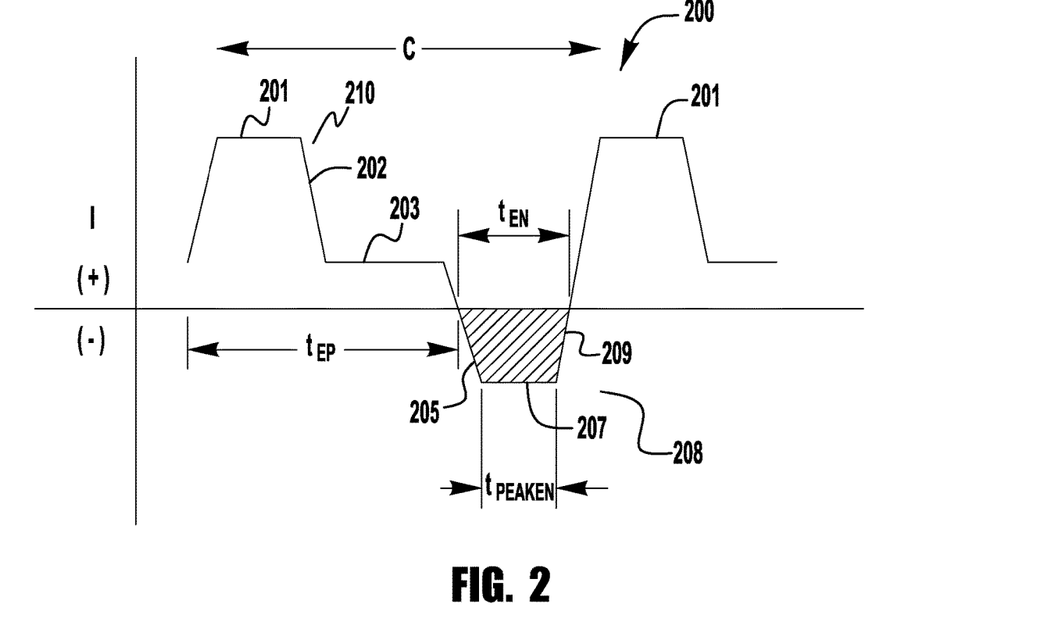
FIG. 2 is a diagrammatical representation of a welding waveform to be used with embodiments of the invention.

FIG. 2 depicts an exemplary current waveform 200 that can be used with embodiments of the present invention. As a general note, the waveform 200 depicted is a generic pulse waveform that is intended to be representative of the many different types of welding current waveforms that can be used in welding operations, especially GMAW/MIG type operations, and embodiments of the present invention are not limited to using current waveforms as depicted in FIG. 2, or in any of the Figures discussed herein. As shown, the waveform 200 has a both an electrode positive (EP) portion 210 and an electrode negative (EN) portion 208 in each cycle C. The EP portion 210 of the waveform 200 is that time in the waveform in which the welding electrode E has a positive polarity (current is flowing from the electrode E into the workpiece W), while during the EN portion 208 the electrode E has a negative polarity such that the current is flowing from the workpiece W into the electrode E.

Each EP portion 210 comprises a pulse 202 having a peak current 201 and a background current level 203 following the peak 201, where the background current level is less than the peak 201 current level. Between the background portion 203 and the following peak 201 of the next cycle C is an EN portion 208. In exemplary embodiments, the EN portion 208 comprises an EN ramp-up portion 205, an EN peak portion 207 and an EN ramp down portion 209. The EN portion 208 has a total duration $t_{EN}$ and a peak duration $t_{PEAKEN}$.

Because each of the EP and EN portions of the waveform 200 have a current and voltage component (voltage is not shown) each portion 210 and 208 is providing power. Thus, each cycle C has a negative power ratio equal to EN Power/EP Power, where EN Power is the total power input by the EN portion 208 and the EP Power is the total amount of power input by the EP portion 210.

During welding, the EN portion 208 of the cycle C provides less heat input into the weld puddle as compared to the EP portion 210. However, the EN portion 208 provides more efficient melting of the advancing electrode E during welding than the EP portion 210. Various embodiments of the present invention employ these attributes of the respective portions of the cycle C to control and optimize heat input into the weld. This will be discussed in detail below.

As shown in FIG. 2, and discussed above, embodiments of the present invention employ an EN portion 208 in cycles C of the waveform 200. This EN portion 208 of the cycle C is generally cooler than the EP portion 210 but can "burn back" the electrode E more efficiently than the EP portion 210. As such the EN portion 208 can be used to aid in regulating workpiece temperature. It should be noted that embodiments of the present invention can be used in both an AC type waveform, or a generally DC waveform which intermittently uses AC as described herein.

As stated earlier, at the beginning of a welding operation the workpiece can be relatively cool and it may be desirable to get the workpiece to an optimal welding temperature quickly. While welding, the temperature of the workpiece can continue to heat up such that the temperature gets too high, thus requiring a cooler welding operation. Embodiments of the present invention provide this heat input control by using workpiece temperature data and/or other parameters to control the heat input into the weld. For example, in exemplary embodiments of the present invention, the system 100 utilizes a waveform 200 with a first negative power ratio during an initial stage of the welding operation, and after the initial stage the waveform 200 is changed to having a second negative power ratio that is larger than that the of the initial stage. The initial stage uses a negative power ratio that is lower than the second stage so that the higher heat input will bring the workpiece to a desired temperature quicker than a normal waveform, but once the workpiece reaches the desired temperature the power supply adjusts the negative power ratio to a higher ratio which lowers the heat input into the weld to stabilize the temperature of the workpiece at an acceptable temperature. In exemplary embodiments, the transition from the initial to second stage of the welding waveform 200 can occur based on sensed temperature data or can be based on the expiration of a predetermined duration into the welding operation. Further, in exemplary embodiments of the present invention, the power supply 110 utilizes a third stage of the welding waveform 200 in which the negative power ratio is adjusted to deal with fluctuations in the workpiece temperature during the welding operation. For example, if the workpiece temperature gets too high, the third stage has a higher negative power ratio to provide less heat input into the weld. This will be explained below, along with the use of other parameters to control heat input and maintained desired weld performance.

In exemplary embodiments, prior to welding a user inputs various weld parameters into the power supply 110/controller 118 needed for the welding operation. These inputs can include current, voltage, wire feed speed, consumable type, workpiece material, workpiece thickness, travel speed, deposition rate, maximum workpiece temperature, critical phase transformation temperature, preheat temperature, distance to weld zone, etc. Based on this information an initial negative power ratio is selected and a second negative power ratio is selected to be used after the initial stage, which has a negative power ratio that is higher than that of the initial negative power ratio (which can be in the range of 1/10 to 2/5). In some exemplary embodiments the second negative power ratio is 4 times higher than that of the initial negative power ratio. In some embodiments, the initial negative power ratio is used for a set duration, after which the power supply 110 switches the waveform 200 to the second negative power ratio. This duration is predetermined, and in some exemplary embodiments can be in the range of 200 ms to 5 s, or sufficient time to establish a stable puddle. Of course, other durations can be used. In other exemplary embodiments, the power supply 110 predetermines a number n of cycles C of the waveform 200 for the initial stage and then at the expiration of the number n (e.g. where n is in the range of 10 to 200), the power supply 110 switches from the initial stage to the second stage. In other exemplary embodiments of the present invention, the power supply 110 uses the input information to determine the initial negative power ratio and during the welding operation uses temperature data to adjust the negative power ratio to achieve the desired welding temperature. That is, as it is determined that the workpiece W is heating up, the negative power ratio is adjusted to provide a cooler welding operation so that the desired or target temperature is maintained. Thus, in such embodiments a target temperature or temperature range is determined the controller 118 adjusts the negative power ratio to reach and maintain the desired temperature/temperature range.

In the embodiment shown in FIG. 1, at least one temperature sensor 170 is used to monitor a welding temperature and the controller 118 uses this information to adjust the negative power ratio of the waveform 200. For example, the sensor 170 provides temperature feedback to the controller 118 and when the detected temperature reaches a desired threshold the controller 200 adjusts the negative power ratio of the waveform 200 to maintain and hold the desired temperature. That is, as the detected temperature gets too high the negative power ratio is increased (to cool the welding process), and as the temperature gets too low the native power ratio is decreased (to add heat to the welding process).

In other exemplary embodiments, more than one sensor 170 can be used, or the sensor 170 can monitor temperature at other regions on the workpiece. Embodiments of the present invention are not limited in this regard.

Further, in other exemplary embodiments, rather than using sensors, the controller 118 (or other CPU device) can calculate, using state tables, algorithms, etc., the heat input into the weld and use these calculations, either by themselves or together with the sensor 170, to adjust the negative power ratio of the waveform 200 as described herein.

Further, in other exemplary embodiments the system 100 can control the ramp rate for heating the workpiece from its starting temperature to a desired welding temperature. In some welding applications it is desirable to ensure that the workpiece W does not heat too quickly. In such embodiments a desired ramp rate for the temperature increase is determined or input into the controller 118 and the controller 118 controls the negative power ratio of the waveform 200 to maintain the desired ramp rate until the desired temperature for welding has been reached.

As explained above, embodiments of the present invention use temperature feedback and/or temperature calculations information to adjust the EN portion 208 of the waveform 200 such that the negative power ratio of the waveform 200 changes to adjust the temperature input into the weld during welding. For example, if it is determined that the temperature of the weld is too high (as the workpiece heats up) the power supply 110 provides a waveform 200 with an increased negative power ratio such that heat input from the arc is lower. That is, by increasing the amount of EN Power output to the arc A, relative to EP Power, the electrode E can continue to be consumed while the arc A is at a cooler temperature. It is noted that during the EN Power the electrode E can be burned back at a faster or more efficient rate and thus in some exemplary embodiments the wire feed speed of the electrode W can also be adjusted by the wire feeder 150 during this portion of the waveform 200. This will be discussed further below. Conversely, when it is detected that the temperature of the workpiece W is too low (such as during the initial phase, or when the workpiece gets too low in temperature during welding) embodiments of the present invention decrease the negative power ratio, by decreasing the EN Power. This results in more EP Power in the waveform 200, which is generally a hotter process. Further, because the electrode E consumption during the EP portion 210 of the waveform is less than that in the EN portion 208, the controller can cause the wire feeder to slow down the wire feed rate of the electrode E during this stage of the waveform 200.

In exemplary embodiments of the present invention, no change is made to the EP portion 210 of the waveform 200 or the frequency of the waveform. Thus, embodiments of the present invention only use changes to the EN portion 208 of the waveform 200 to maintain or change the temperature. This allows for precision temperature control without fundamentally changing the waveform 200, especially its frequency. In other exemplary embodiments, the negative power ratio is changed without making any changes to positive pulses 202 of the waveform. That is the peak 201, duration and ramp rates of the positive pulses 202 remaining unchanged, but changes can be made to the duration of the background portion 203 of the EP portion 210. In such embodiments it may be necessary to adjust the wire feed speed to ensure there is no or a minimal change in arc length.

Embodiments of the present invention can utilize adjustment to various aspects of the EN portion 208 to achieve the desired temperature or temperature rate of change. For example, changes to the EN portion can include changes to the lead current ramp rate 205, the peak 207—through changes to magnitude or $t_{PEAKEN}$, the trail current ramp rate 209, and/or the duration $t_{EN}$ of the EN portion 208. That is, the power supply 110 can adjust any one, any combination, or all of these parameters of the EN portion 208 to change the negative power ratio to drive the temperature of the workpiece to the setpoint temperature.

As explained above, in embodiments of the present invention during the initial stage of the welding operation a first negative power ratio can be used to drive the temperature to a desired value, and embodiments of the present invention can use a fixed first negative power ratio during the first stage, where the fixed ratio is determined the power supply 110/controller 118. However, in other exemplary embodiments, the rate of increase of the temperature during the first stage is monitored and the negative power ratio is adjusted to ensure that the desired rate of temperature increase is achieved. This will prevent the temperature of the workpiece W from increasing too quickly or too slowly. For example, it may be desirable to get the workpiece W to the welding temperature as quickly as possible, or otherwise prevent the workpiece W from heating too quickly.

Embodiments of the present invention can use various feedback or control methodologies to control the negative power ratio of the waveform 200. For example, the power supply 110 can continuously monitor the workpiece temperature (within the systems designed update rate) and adjust the negative power ratio as soon as deviations are detected. In exemplary embodiments of the present invention, the update rate for the temperature is in the range of 1 to 10 KHz. Of course other update rates can be used without departing from the scope or spirit of the present invention. Other embodiments can use different feedback methodologies. For example, the power supply 110/controller 118 can monitor the temperature of the workpiece over a plurality N of cycles C of waveform 200 or over a period of time and compare the determined or measured temperature with a temperature setpoint value to determine if a change in the negative power ratio should be made. Of course other control methodologies can be used without departing from the spirit or scope of the present invention.

In another exemplary embodiment, the power supply 110 and/or controller 118 monitors and/or calculates the instantaneous temperature (based on the update or sample rate of the system used) to determine if a deviation from the setpoint is detected but does not change the waveform 200 until after a plurality of sequential deviations are detected. Such embodiments avoid changing the waveform 200 based on the detection of anomalies that are short in duration and self correct in a short amount of time. For example, in an exemplary embodiment, the system compares the detected/calculated temperature to the setpoint and if a deviation is detected the controller 118 starts a counter which counts the number of sequential deviations following the first. When the number of sequential deviations detected exceeds a desired amount, the negative power ratio is changed as described herein. For example, the sequential number of deviations detected can be in the range of 5 to 20. In some embodiments, if the detected/calculated temperature returns to the setpoint prior to reaching the predetermined number of sequential deviations no change in the waveform 200 will be made and the counter will be reset to zero.

In other exemplary embodiments, the update rate for the detection/calculation of the actual temperature changes when a deviation is detected. For example, during welding a first update rate is used and when a deviation is detected the update rate changes to quicker update rate to monitor the temperature and provide the negative power ratio adjustment.

It is noted that in other exemplary embodiments of the present invention, the negative power ratio can remain constant while the power supply 110 adjusts its output current to maintain a desired temperature. In such an embodiment, rather than changing the negative power ratio the power supply 110 changes the negative duration ratio, where the negative duration ratio is $t_{EN}/t_{EP}$. In such an embodiment, the power supply 110 adjusts the duration $t_{EN}$ of the EN portion 208 so that the waveform has an EN state for a longer duration, but there is no change in the negative power ratio. In such an embodiment, even though the peak current 207 of the EN portion 208 is reduced, the increased duration of the EN portion 208 will result in utilizing a cooler portion of the waveform 200 for a longer duration. In such embodiments, it may be necessary to change at least the wire feed speed of the electrode E to maintain a desired arc length.

As discussed above, embodiments of the present invention can use a first negative power ratio at the beginning of the welding process and then switch to a higher negative power ratio during welding, which is cooler than the first ratio. However, even with this cooler second negative power ratio it is possible that the workpiece W will heat up too much, thus requiring further cooling during welding. Thus, in embodiments of the present invention a third stage of the waveform 200 can be used from time to time to provide even further cooling, where the third stage utilizes a negative power ratio or negative duration ratio that is higher than that of the second stage.

Figure 3:
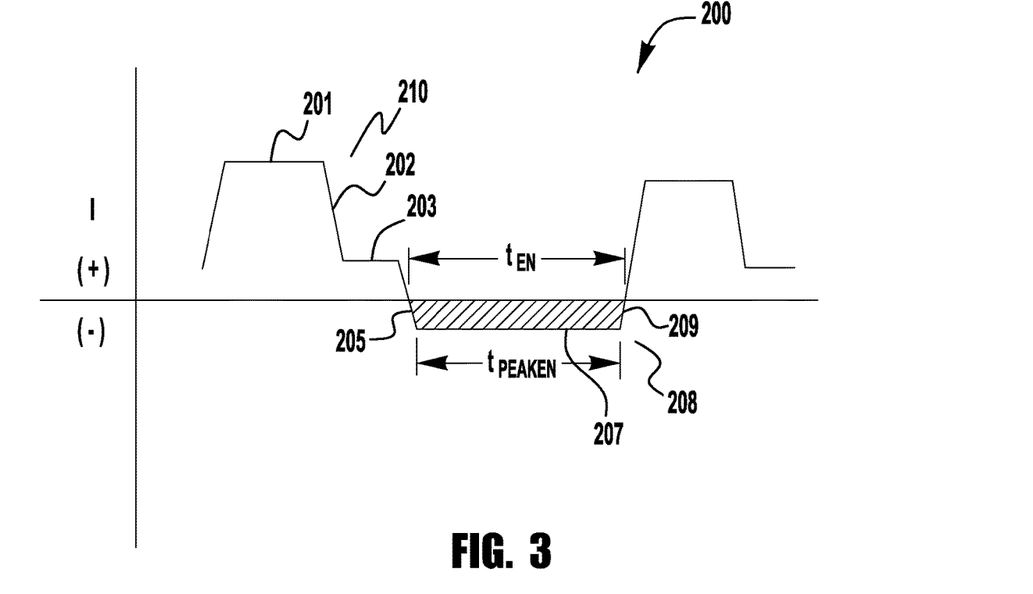
FIG. 3 is a diagrammatical representation of another welding waveform to be used with embodiments of the invention.

This is generally depicted in FIG. 3, where the waveform 200 is adjusted such that the either one or both of the negative power ratio and negative duration ratio have been increased to make the waveform 200 cooler. For example, as shown in FIG. 3, the waveform 200 has been changed such that the duration $t_{EN}$ of the negative portion 208 has been increased relative to the overall length of the cycle C. This will result in a longer duration of cooler welding time per cycle C. In some exemplary embodiments, the overall negative power provided is not increased during this negative portion 208—because the peak level 207 of the negative current is reduced—which is cooler than if the peak level 207 remains the same as in the second stage. In some exemplary embodiments of the present invention, the duration $t_{EN}$ of the third stage is in the range of 10 to 45% larger than the duration $t_{EN}$ during the second stage. Of course other differences can be used without departing from the spirit or scope of the present invention. The third cooling stage can modify any one, or all, of the attributes of the negative portion 208 of the waveform 200 such that the desired cooling is achieved.

In exemplary embodiments of the present invention the parameters of the EN portion 208 third or "cool down" stage of the waveform 200 can be predetermined by the power supply 110/controller 118 based on the input information prior to welding. That is, based on the input information the duration, peak level and ramp rates of the EN portion 208 can be predetermined such that when it is detected that a cool down process must be implemented the power supply 110 uses the predetermined cool down profile for the EN portion 208. However, in other exemplary embodiments the parameters of the EN portion 208 during the cool down stage of the waveform 200 are selected based on the detected temperature. For example, the power supply 110/controller 118 determines the changes to the EN portion 208 based on the determined difference between the temperature and setpoint temperature. This can be done using algorithm-type control, state tables, etc. For example, if the measured difference is within a first range of the setpoint then only the duration $t_{EN}$ of the EN portion 208 is changed, where the change in duration is a function of the detected difference (e.g., duration is increased or decreased proportionally with the difference from the setpoint), while if the difference is outside of that first range the controller 118/power supply 110 increases the duration of the EN portion 208 and reduces the peak current 207 of the EN portion, to provide less power overall in the negative portion 208. Again, the changes can be proportional to the differences detected from the desired setpoint. Such embodiments allow the power supply 110 and/or controller 118 to constantly modify the EN portion of the waveform to control the overall heart input into the welding process. In exemplary embodiments of the present invention, the first range discussed above is within 4 to 20% of the setpoint. That is, the outer bound of the first range is within 4 to 20% of the setpoint. Of course, other ranges can be utilized. If the setpoint is actually an operational range the above percentages are to be considered from the respective end points of the operational range—for example, within 4 to 20% of the upper range limit and within 4 to 20% of the lower range limit.

It should be noted that while the discussions above and below often refer to a temperature "setpoint," some embodiments can use a temperature range as an operational setpoint where as long as the temperature is within the operational range, no change will be made to the waveform 200 or operation. Temperature can be a set point or a range. For example, the operational range can be 50 degrees C., in other exemplary embodiments, the range can be in the range of 150 to 260 degrees C. It should be noted that to avoid confusion the discussions herein refer to "setpoint" for clarity, but these discussions equally apply to using an operational range as the "setpoint."

It is noted that in some exemplary embodiments the waveform 200 is controlled such that the positive pulse 202 is started directly after the completion of the EN portion 208 of the waveform—see FIG. 2. However, in other embodiments this may not be the case. For example, as described above, embodiments can end the EN portion 208 early to reach/maintain a desired temperature. In such embodiments the current can return to the positive background 203 before beginning the next pulse, so that the waveform frequency is maintained.

Various methods of control or control methodologies can be used to implement the described embodiments. For example, the controller 118 can utilize state tables, look up tables or algorithm type control methodologies to implement embodiments of the present invention. Such embodiments would utilize the detected and/or determined temperature and a temperature setpoint (or range) and use this information to determine which waveform stage to be used, or determine the amount and type of change to the EN portion 208 of the waveform 200 to maintain the desired temperature. It is noted that embodiments of the present invention can change different aspects of the EN portion (for example, peak current ramp rates, duration) based on the deviation between the measured/determined temperature and the setpoint. Thus, in some embodiments a more aggressive change to the EN portion 208 can be made when the detected difference is large.

In further exemplary embodiments of the present invention, the power supply 110 and/or controller 118 can utilize changes in other aspects of the welding operation to reach or maintain a desired temperature. For example, in some embodiments the controller 118 can control motion device 160 to change the travel speed of the welding operation in addition to changing the EN portion of the waveform 200 to achieve the desired temperature. In such embodiments, as the temperature increases the controller 118 can also cause the travel speed to increase to aid in reaching or maintaining the desired temperature. Alternatively, if the temperature is too low the controller 118 can cause the travel speed to slow down to aid in maintaining the desired temperature.

Figure 4A:
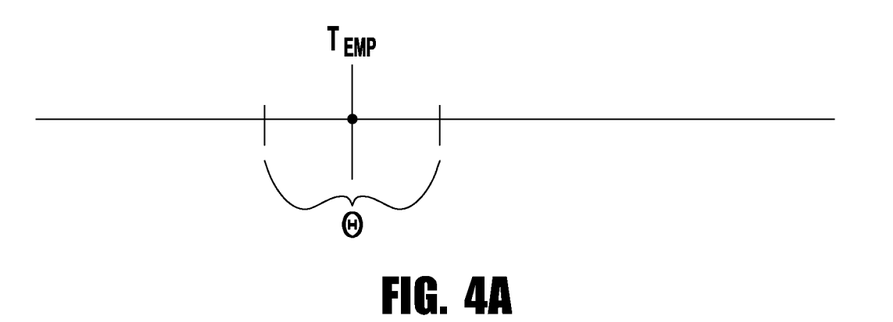
FIGS. 4A and 4B are pictorial representations of various control methodologies that can be used with embodiments of the present invention.

In some exemplary embodiments, the magnitude of deviation between the temperature and the setpoint can determine the extent with which the travel speed is utilized to aid in maintaining or returning to the setpoint. FIG. 4A can be utilized to aid in this discussion.

As shown in FIG. 4A, a power supply can have a temperature setpoint Temp. (It should be noted that as discussed above, an operational range can be used for Temp.—however, for purposes of this figure a setpoint is used). As shown, in some embodiments a first operational range $\theta$ is established around Temp. Although FIG. 4A depicts the first operational range $\theta$ as centered on Temp., this need not be the case in all embodiments. The first operational range $\theta$ has a range of temperature such that if the temperature is within the first operational range $\theta$ a first temperature change protocol is used to maintain the desired temperature for the operation, whereas if the temperature is outside of the first operational range $\theta$ then a second temperature change protocol is used to maintain the desired temperature. For example, if the determined temperature is within the first operational range $\theta$ then the power supply 110/controller 118 uses adjustments only to the waveform 200 (as described above) to maintain the desired temperature, while if the temperature is outside of the first operational range $\theta$ the controller 118 implements a change to the waveform 200 and to the travel speed to return to the desired temperature. Of course, other parameters can be adjusted depending on whether or not the temperature is within or outside of the first operational range $\theta$. For example, when within the first operational range $\theta$ the power supply 110 may adjust one parameter (e.g., ramp rate, peak, duration) of the EN portion 208 and while outside the first operational range θ the power supply 110 will adjust at least two parameters (e.g., ramp rate, duration, peak current) which may include the first parameter. Various embodiments can use different combinations of any of the parameters discussed herein to adjust the negative power ratio, the negative duration ratio, and/or the travel speed to adjust the temperature to the setpoint.

Figure 4B:
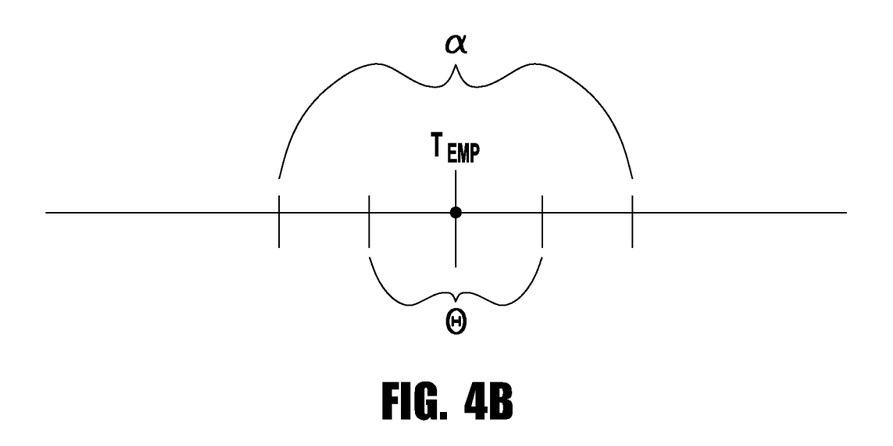

FIG. 4B represents another embodiment of the present invention, where there is a first operational range θ, which is used as discussed above, and a second operational range α, which is used similarly to that discussed above. That is, during the first operational range θ a first parameter or grouping of parameters is used to control temperature, while in the second operational range α a second parameter or grouping of parameters is used to control the temperature, and when outside of the second operational range a third parameter or grouping of parameters is used to the control the temperature. For reference, the parameters that can be used include the negative power ratio, the negative duration ratio, current ramp rate(s), peak current, and duration of the EN portion, the travel speed, and current ramp rates, peak current and duration of the EP portion, and wire feed speed.

It should be noted that because of the difference in the "burn back" rates of the electrode E during the negative and positive it may be necessary to adjust the wire feed speed of the electrode E during the different waveform stages to adjust for changes in the negative power ratio and/or travel speed to ensure that sufficient filler delivery is made to the weld. During the EN portion 208 of the waveform 200 the electrode E can be consumed more efficiently and as such as the negative power ratio increases it may be needed to increase the wire feed speed. Such changes can be made with the controller 118 and the wire feeder 150.

Figure 5:
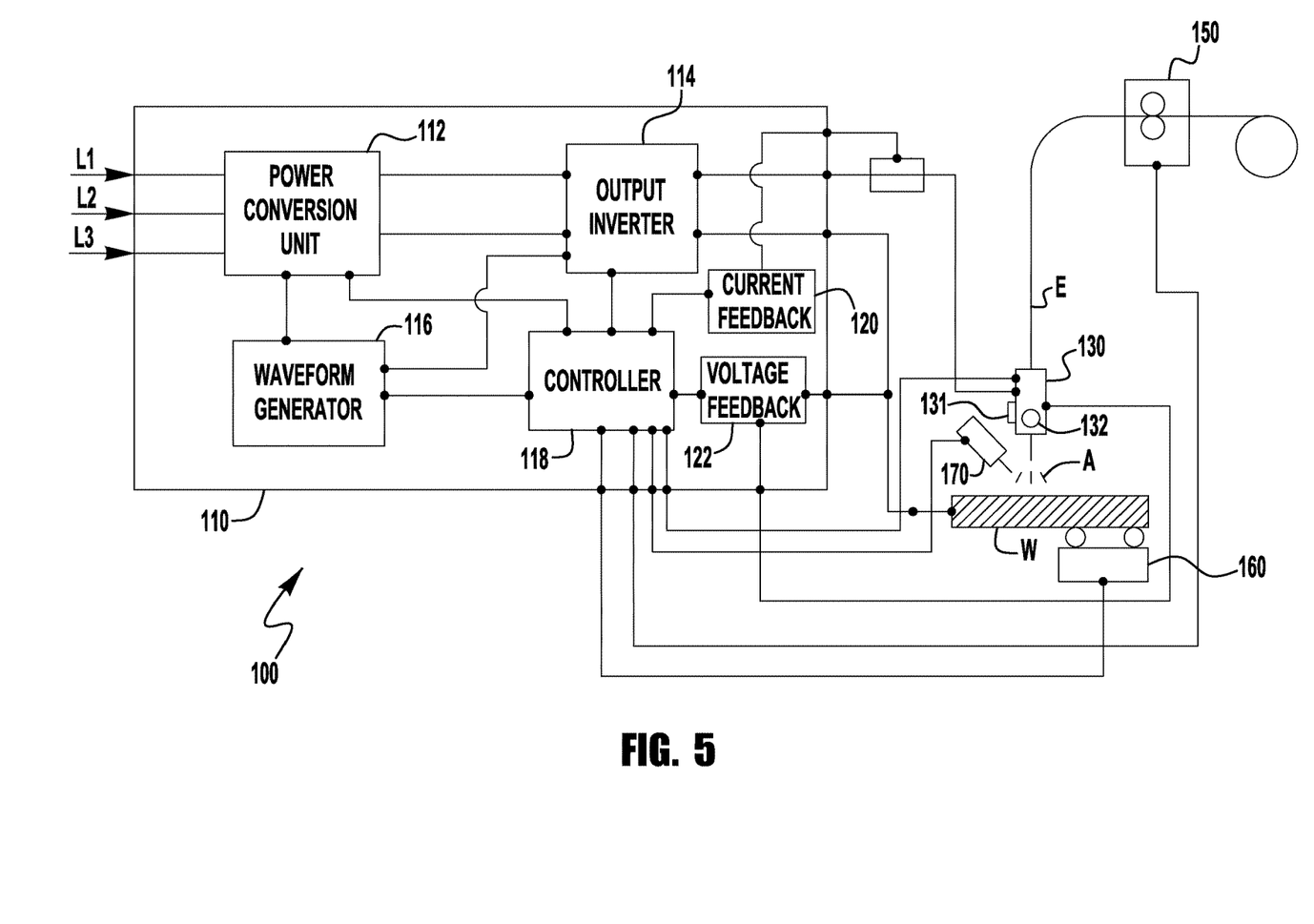
FIG. 5 is a diagrammatical representation of another exemplary embodiment of the present invention.

FIG. 5 is another exemplary embodiment of the present invention, in which the system 100 provides for a user to be able to initiate a cooling third waveform stage during welding. Such embodiments can be used with semi-automatic welding systems and operations. Specifically, in the embodiment shown the torch 130 contains a switch 131 which can be activated by the user while welding. It is noted that in this embodiment the torch 130 can be a handheld welding torch, with a known construction. The switch 131 is coupled to controller such that during welding the user can activate the switch 131 and changed the waveform 200 such that the temperature being input into the weld is less. For example, the activation of the switch can change the waveform 200 from the second stage to the cool-down stage (discussed above) so that the waveform 200 can be a cooler welding waveform. Thus, the user can have control of the heat input at the torch 130. In a further exemplary embodiment an indicator 132 can be mounted on the torch 130. The indicator can be any device, such as an LED light that indicates that the temperature of the welding operation is within, or outside of, the welding temperature parameters. For example, during normal operation the indicator 132 can be colored green to indicate that the temperature of the workpiece/weld is acceptable. If the temperature is too hot the indicator can change to the color red, indicating to the user that the cool-down switch 131 should be triggered and when the temperature reaches the desired level the indicator will change from red to green. In other embodiments further indication can be provided to the user. For example, if the temperature is too cool for a desired operation, the indicator 132 can show a blue color indicating that the temperature is too cool such that the user can slow down the welding process and/or release the switch 131. Additionally, the indicator can provide an intermediate signal, such as a yellow illumination indicating that the temperature is within an acceptable operating range but is approaching an outer limit of the operating range such that the user can attempt to adjust the welding process without engaging the switch 131. Thus, embodiments of the present invention can allow the user to implement a cool-down stage of the waveform 200 by manual activation of the switch, where the waveform 200 is changed such that it provides a cooler welding operation. Further, the indicator 132 can provide the user with visual cues or indication to provide instruction or information related to weld temperature during the welding process.

Of course, in exemplary embodiments the wire feed speed of the electrode E can also be changed by the controller 118—to the appropriate speed—when the user engages the switch 131. In some embodiments the wire feed speed can also remain fixed, depending on the welding operation.

In some exemplary embodiments of the present invention, even though the negative power ratio changes from one stage to another, the overall power generated by each cycle C does not change from one cycle C to the next. That is, the total cycle power for each cycle C of the waveform 200 does not change from cycle to cycle even though the negative power ratio changes as described herein. In such embodiments, the power provided during the welding process remains constant.

These above described embodiments, as well as others consistent with the scope described herein result in controlling and maintaining a desired arc length while minimizing heat input and without requiring changes in the frequency or EP portions of the waveform. Such control provides significant advantages over known control methodologies, which would increase heat input, change the welding frequency or otherwise modify all aspects of the waveform.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. An arc welding power supply configured to output a welding waveform to a welding torch, the arc welding power supply comprising:
   a waveform generator to generate an output welding waveform; and
   a controller to control the output welding waveform based on a comparison between a desired welding temperature and a detected welding temperature from at least one temperature sensor,
   wherein the control is performed by adjusting at least one of a power ratio and a duration ratio,
   wherein the power ratio is a ratio of a power of a negative portion of the welding waveform to a power of a positive portion of the welding waveform,
   wherein the duration ratio is a ratio of a duration of a negative portion of the welding waveform to a duration of a positive portion of the welding waveform,
   wherein the desired welding temperature is one of a temperature setpoint and a temperature range,
   wherein the controller controls the at least one of a power ratio and a duration ratio to a first value during a first stage of welding operations and to a second value that is larger than the first value during a second stage of welding operations, and the first stage lasts for a predetermined duration in a range of 200 ms to 5 s.

2. The arc welding power supply of claim 1, wherein the controller is configured to receive at least one temperature signal from the at least one temperature sensor corresponding at least one of a weld puddle and workpiece.

3. The arc welding power supply of claim 2, wherein during the second stage of welding operations the controller further adjusts a travel speed of the welding torch based on the temperature signal to maintain the desired welding temperature.

4. An arc welding system, comprising:
a welding torch;
at least one temperature sensor configured to transmit a temperature signal corresponding at least one of a weld puddle and workpiece;
a welding power supply configured to output a welding waveform to the welding torch, the welding power supply comprising,
a waveform generator to generate an output welding waveform; and
a controller to control the output welding waveform based on a comparison between a desired welding temperature and a detected welding temperature from the transmitted temperature signal,
wherein the control is performed by adjusting at least one of a power ratio and a duration ratio,
wherein the power ratio is a ratio of a power of a negative portion of the welding waveform to a power of a positive portion of the welding waveform,
wherein the duration ratio is a ratio of a duration of a negative portion of the welding waveform to a duration of a positive portion of the welding waveform,
wherein the desired welding temperature is one of a temperature setpoint and a temperature range, and
wherein the controller controls the at least one of a power ratio and a duration ratio to a first value during a first stage of welding operations and to a second value that is larger than the first value during a second stage of welding operations, and the first stage lasts for a predetermined duration in a range of 200 ms to 5 s.

5. An arc welding system, comprising:
a welding power supply configured to output a welding waveform to a welding torch, the welding power supply comprising,
a waveform generator to generate an output welding waveform;
at least one temperature sensor configured to transmit a temperature signal corresponding at least one of a weld puddle and workpiece; and
a controller to control the output welding waveform based on a comparison between a desired welding temperature and a detected welding temperature,
wherein the control is performed by adjusting at least one of a power ratio and a duration ratio,
wherein the power ratio is a ratio of a power of a negative portion of the welding waveform to a power of a positive portion of the welding waveform,
wherein the duration ratio is a ratio of a duration of a negative portion of the welding waveform to a duration of a positive portion of the welding waveform, and
wherein the desired welding temperature is one of a temperature setpoint and a temperature range,
wherein the controller controls the at least one of a power ratio and a duration ratio to a first value during a first stage of welding operations and to a second value that is larger than the first value during a second stage of welding operations, and the first stage lasts for a duration in a range of 200 ms to 5 s, and
wherein, during the second stage of welding operations subsequent to the first stage, the controller adjusts both a travel speed of the welding torch and the at least one of a power ratio and a duration ratio based on the temperature signal to maintain the desired welding temperature.

6. The arc welding system of claim 4, further comprising:
a wire feeder configured to provide a wire at a desired wire feed speed, wherein the wire feed speed is controlled to maintain a desired arc length.

7. The arc welding power supply of claim 1, wherein the positive portion of the welding waveform includes a background portion and a pulse portion, and, when adjusting the at least one of a power ratio and a duration ratio, the controller adjusts a duration of the background portion.

8. The arc welding system of claim 5, wherein the positive portion of the welding waveform includes a background portion and a pulse portion, and, when adjusting the at least one of a power ratio and a duration ratio, the controller adjusts a duration of the background portion.

9. The arc welding power supply of claim 1, wherein the first value is in a range of $1/10$ to $2/5$.

10. The arc welding power supply of claim 9, wherein the second value is four times higher than the first value, and
wherein the first value is selected based on at least one of a welding current, a welding voltage, a wire feed speed, a wire type, a workpiece material type, a workpiece thickness, a travel speed, a deposition rate, a maximum workpiece temperature, a critical phase transformation temperature, a preheat temperature, and a distance to weld zone.

11. The arc welding power supply of claim 1, wherein the controller adjusts a power of the negative portion of the welding waveform including adjusting a peak current magnitude, a peak current duration, a current ramp rate, or the duration of the negative portion of the welding waveform.

12. The arc welding power supply of claim 4, wherein the controller adjusts a power of the negative portion of the welding waveform including adjusting a peak current magnitude, a peak current duration, a current ramp rate, or the duration of the negative portion of the welding waveform.

13. The arc welding system of claim 4, wherein the first value is in a range of $1/10$ to $2/5$.

14. The arc welding system of claim 13, wherein the second value is four times higher than the first value, and
wherein the first value is selected based on at least one of a welding current, a welding voltage, a wire feed speed, a wire type, a workpiece material type, a workpiece thickness, a travel speed, a deposition rate, a maximum workpiece temperature, a critical phase transformation temperature, a preheat temperature, and a distance to weld zone.

15. The arc welding system of claim 4, wherein the predetermined duration is selected to provide sufficient time to establish a weld puddle on the workpiece.

\* \* \* \* \*